US010800138B2

(12) United States Patent
Dua et al.

(10) Patent No.: US 10,800,138 B2
(45) Date of Patent: Oct. 13, 2020

(54) HIGH PERFORMANCE ORGANIC, INORGANIC OR HYBRID SEALS

(71) Applicant: Ferro Corporation, Mayfield Heights, OH (US)

(72) Inventors: Vineet Dua, Parma Heights, OH (US); Chandrashekhar S. Khadilkar, Broadview Heights, OH (US); Srinivasan Sridharan, Strongsville, OH (US); George E. Sakoske, Independence, OH (US); Jackie Davis, Cleveland, OH (US)

(73) Assignee: Ferro Corporation, Mayfield Heights, OH (US)

( * ) Notice: Subject to any disclaimer, the term of this patent is extended or adjusted under 35 U.S.C. 154(b) by 97 days.

(21) Appl. No.: 15/904,524

(22) Filed: Feb. 26, 2018

(65) Prior Publication Data
US 2018/0186120 A1 Jul. 5, 2018

Related U.S. Application Data

(62) Division of application No. 13/795,116, filed on Mar. 12, 2013, now abandoned.
(Continued)

(51) Int. Cl.
*B23K 35/36* (2006.01)
*B32B 7/04* (2019.01)
*B32B 37/12* (2006.01)
*B23K 35/22* (2006.01)
*C03C 27/04* (2006.01)
*B23K 35/365* (2006.01)
(Continued)

(52) U.S. Cl.
CPC ............ *B32B 7/04* (2013.01); *B23K 35/0244* (2013.01); *B23K 35/22* (2013.01); *B23K 35/365* (2013.01); *B23K 35/3613* (2013.01); *B32B 37/12* (2013.01); *C03C 27/04* (2013.01); *C03C 27/08* (2013.01); *C03C 27/10* (2013.01);
(Continued)

(58) Field of Classification Search
CPC ....... B32B 7/04; B32B 37/12; B32B 2457/00; C03C 27/10; C03C 27/08; C03C 27/04; B23K 35/0244; B23K 35/365; B23K 35/3613; B23K 35/22; Y10T 428/239; Y10T 156/10
USPC ........................................................ 156/209
See application file for complete search history.

(56) References Cited

U.S. PATENT DOCUMENTS 4,563,843 A   1/1986   Grether et al.
5,179,046 A * 1/1993   Francis .................... C03C 8/16
                                                                     501/15

(Continued)

OTHER PUBLICATIONS

Paul Martin, Handbook of Deposition Technologies for Films and Coatings, Elseiver, 3rd Edition, Deposition Technologies p. 23 (Year: 2005).*

(Continued)

*Primary Examiner* — Michael N Orlando
*Assistant Examiner* — Christian Roldan
(74) *Attorney, Agent, or Firm* — Rankin, Hill & Clark LLP; Christopher Jan Korff

(57) ABSTRACT

The present invention describes a new method for creating hybrid edge seals using metal, alloy, powder coated metal and other conductive surfaces in between two substrates. The methods utilize various materials, seal designs, and geometries of hybrid seals based on polymeric powder coatings and glass powder coatings.

20 Claims, 2 Drawing Sheets

Related U.S. Application Data

(60) Provisional application No. 61/609,414, filed on Mar. 12, 2012.

(51) Int. Cl.
  *B23K 35/02* (2006.01)
  *C03C 27/08* (2006.01)
  *C03C 27/10* (2006.01)

(52) U.S. Cl.
  CPC ......... *B32B 2457/00* (2013.01); *Y10T 156/10* (2015.01); *Y10T 428/239* (2015.01)

(56) References Cited

U.S. PATENT DOCUMENTS

| | | | |
|---|---|---|---|
| 6,399,169 B1 * | 6/2002 | Wang | E06B 3/6612 428/34 |
| 6,837,075 B1 * | 1/2005 | Snowdon | G02B 6/4248 501/22 |
| 2002/0022132 A1 | 2/2002 | Ebisawa et al. | |
| 2003/0108664 A1 | 6/2003 | Kodas et al. | |
| 2005/0117193 A1 | 6/2005 | Poll et al. | |
| 2006/0058427 A1 * | 3/2006 | O'Neill | B01F 3/18 523/319 |
| 2006/0187608 A1 * | 8/2006 | Stark | C03C 27/08 361/202 |
| 2008/0166570 A1 * | 7/2008 | Cooper | E06B 3/6612 428/426 |
| 2009/0155500 A1 | 6/2009 | Cooper et al. | |

OTHER PUBLICATIONS

J.P. Holman, Heat Transfer, Mcgraw Hill, 10th Ed, p. 6 (Year: 2009).*

* cited by examiner

HIGH PERFORMANCE ORGANIC, INORGANIC OR HYBRID SEALS

CROSS REFERENCE TO RELATED APPLICATIONS

The present invention is a divisional application of prior U.S. patent application Ser. No. 13/795,116, filed Mar. 12, 2013, which claims the benefit of U.S. Provisional Application Ser. No. 61/609,414, filed Mar. 12, 2012, both of which are incorporated herein by reference.

BACKGROUND OF THE INVENTION

1. Field of Invention

The invention describes a new method for creating hybrid edge seals using metal, alloy, powder coated metal and other conductive surfaces in between two substrates. These inventions describe different materials, seal designs, and geometries of hybrid seals based on polymeric powder coatings and glass powder coatings on conductive surfaces.

2. Description of Related Art

Many conventional heating methods suffer the problem of overheating substrates in the effort to heat and flow a seal material. Further much energy is wasted due to unwanted heating of the entire mass of substrates. Therefore, selective sealing methods wherein the seal material alone is heated are attractive from energy saving point of view.

Laser sealing is a widely investigated selective sealing process, among various selective heating processes such as laser sealing, induction heating, microwave heating, broadband IR (Infrared) lamp heating, and focused IR heating. Even in all these selective heating methods unwanted heating of substrates does occur. Conventional frit-based laser sealing processed involve absorption of an Infra-Red (IR) laser light by an absorber such as pigment or colored frit in the seal system. Accordingly, the IR absorption (i.e., heating) occurs at the top interface-the interface between a substrate and the seal material. Owing to the thickness and mass of material to be heated, the amount of heat supplied must be relatively high. Conventional laser sealing processes involve absorption of IR radiation by an appropriate pigment or colored frit in the sealant material. Deposited seals are typically about 60% or less of their theoretical density before melting/sintering. Therefore, significant dimensional changes are to be expected during laser processing (or any related localized energy deposition process) to form the seal. The process can be time consuming because such a large mass of material must be heated, which can be problematic. For example, conventional frit based laser sealing material includes an organic binder which can provide contamination within a cavity formed by the sealed substrates from combustion of the binder upon heating. The resulting seal may also have large voids and bubbles that could reduce the strength of the seal. Since most of the heat is generated at the substrate/seal material interface, it is more likely that the seal material and the substrate plate may crack. Similar problems arise in other selective sealing processes where IR, visible or UV lights are used for sealing.

In many of the practically useful applications of glass to glass sealing, such as encapsulation of solar cells (crystalline silicon as well as thin film based cadmium telluride (CdTe), copper indium gallium selenides (CIGS), polymeric, or flexible), OLED packaging, displays, touch screens and Vacuum Insulated Glass (VIG) window sealing, and architectural or automotive window sealing, there exists a need to use tempered glasses in many instances. Glasses lose their temper when heated above about 350° C. in conventional furnace firing of sealing glass materials. Therefore, there exists a need to selectively heat the seal material alone and to effect the bonding to the base glasses/substrates without significantly heating the base glasses/substrates. Similarly there exists a need to selectively heat the seal material alone and to effect the bonding to the base glasses/or glass to metal seals without significantly heating the base glasses.

Accordingly improvements are sought in selective sealing processes.

BRIEF SUMMARY OF THE INVENTION

There is an urgent need for moisture barrier films and edge seals for thin film, crystalline silicon solar cell modules, optoelectronic devices (e.g., LEDs, OLEDS), displays (such as plasma display panel (PDP) and Microdisplays), and vacuum insulated glass windows (VIG) and assemblies. The lifespan of solar devices could be increased by protecting it from moisture and oxygen ingress which in turn will reduce the levelized cost of energy (LCOE). Similarly the service life of VIG windows in providing insulation of thermal conduction can be extended if the seals are effectively impervious to moisture and gas.

In this invention the following is contemplated: (1) hybrid edge seal using powder coating (polymeric and glass based) on metals and other conductive surfaces, (2) localized curing of the powder coatings using a conduction mechanism, and (3) minimizing moisture and oxygen ingress by using metal/alloy spacer as bulk of the edge seal.

An embodiment of the invention is a method of locally heating a sealing material to produce a hermetic seal, comprising: (a) providing a metal object between at least two substrates; (b) providing a seal material, (c) contacting the seal material to the at least two substrates and at least partially surrounding the metal object, and (d) heating the metal object to heat the seal material to a temperature of at least 125° C., wherein the substrate temperature remains at least 20° C. below the temperature attained in the seal, to flow the seal material between the substrates, whereby a seal between the substrates results.

An embodiment of the invention is a device including a seal, the device formed by a method of locally heating a sealing material comprising: (a) providing a metal object between at least two substrates; (b) providing a seal material between the two substrates and at least partially surrounding the metal object, and (c) heating the metal object to heat the seal material to a temperature of at least 125° C., wherein the substrate temperature remains at least 20° C. below the temperature attained in the seal, to flow the seal material between the substrates.

BRIEF DESCRIPTION OF THE DRAWINGS

FIG. 3 depicts an embodiment of the invention including two glass plates with a metal sheet sealed there between.

DETAILED DESCRIPTION OF THE INVENTION

Figure 1:
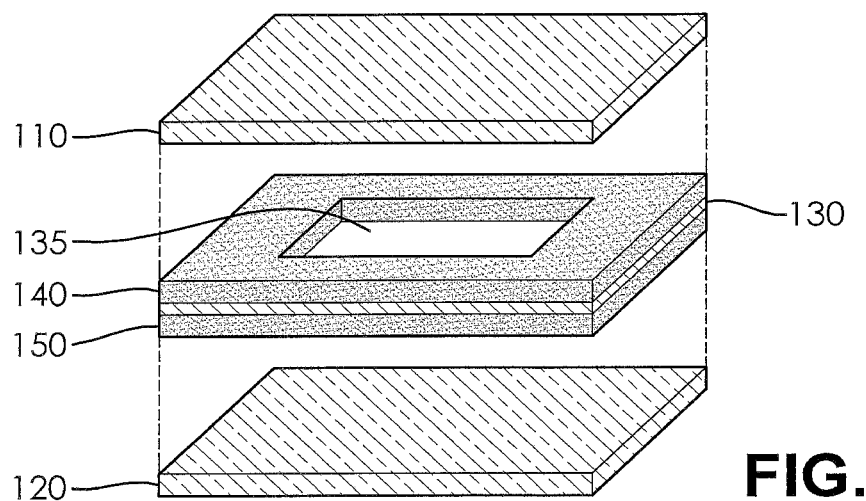
FIG. 1 is an exploded view of the components used in a sealed object of the invention.

The present invention provides materials, seal designs, geometries and process steps for making hermetic seals, and simplifying the manufacture of hermetic seals which are used to protect active layers of electronic devices such as solar cells, LEDs, OLEDs, plasma display panels and the like.

A variety of substrates including those made of glass, metal, ceramic, or plastics, as well as those constituting active devices may be sealed together by this invention to create a hermetic seal in devices such as display devices (flat panel screens, LED screens, LCD screens, plasma display panels), organic light emitting diodes (OLEDs), solar cells and solar cell panels, and even windows for both architectural and automotive applications. The substrates may be coated with a coating such as conductive coated glass, indium tin oxide, aluminum doped zinc oxide, sputtered metals, antireflective coatings, $SiN_x$ coatings, $Si_3N_4$ coatings, conductive polymer coatings on glass, and combinations thereof.

An embodiment of the invention is a method of locally heating a sealing material to produce a seal, comprising: (a) providing a metal object between at least two substrates; (b) providing a seal material, (c) contacting the seal material to the at least two substrates and at least partially surrounding the metal object, and (d) heating the metal object to heat the seal material to a temperature of at least 125° C., wherein the substrate temperature remains at least 20° C. below the temperature attained in the seal, to flow the seal material between the substrates, whereby a seal between the substrates results.

An embodiment of the invention is a device including a seal, the device foi ned by a method of locally heating a sealing material comprising: (a) providing a metal object between at least two substrates; (b) providing a seal material between the two substrates and at least partially surrounding the metal object, and (c) heating the metal object to heat the seal material to a temperature of at least 125° C., wherein the substrate temperature remains at least 20° C. below the temperature attained in the seal, to flow the seal material between the substrates.

This invention describes a durable powder coating technique (with metal as a spacer) to use as a barrier coating material to (a) increase moisture resistance of an edge seal, (b) engineer glass-resin and metal-resin interface to obtain films with excellent barrier properties, (c) formulate edge seals with excellent moisture resistance to enhance the useful life of solar and other active devices, (d) selectively heat metal/glass interfaces through conduction of heat from thermal or induction heating of metal far away from the glass; (this will reduce manufacturing time and cost) as well as (e) significantly reduce curing time using thermal conduction through metallic surface in module manufacturing to reduce module costs.

The advantages of this approach include (a) use of polymer chemistries besides EVA with excellent UV and outdoor stability by use of a variety of powder coatings both polymeric and glass based, (b) use of metal/alloy spacer to reduce moisture and oxygen ingress, (c) use of proven deposition methods like electrostatic deposition or wet deposition, (d) faster and localized curing by simple use of conduction mechanism, (e) suitability of time-temperature curing cycles for PV module manufacturing at 150° C. for 1-10 minutes, (f) potential to formulate back side film with desired reflective by using powder coated metal.

The seals may be hermetic, with a hermeticity as measured by helium leak rate of less than $10^{-5}$ atm*cc*sec$^{-1}$, preferably less than $10^{-7}$ atm*cc*sec$^{-1}$, more preferably less than $10^{-8}$ atm*cc*sec$^{-1}$.

The major components of the invention are set forth hereinbelow.

Substrate.

The substrates can be, broadly speaking, glass, ceramic, glass-ceramic, metal, or polymeric. They are independently selected. Composite substrates are also suitable, for example polymer matrix composites, polymer glass composites, metal matrix composites, or ceramic matrix composites. In particular the substrates may be any of metal, glass, glass-ceramics, very low expansion glass ceramics, ceramics, window glass, low expansion borosilicate glass Borofloat® 33 glass, aluminosilicate glass, surface strengthened alkali aluminosilicate glass ion exchanged alkali aluminosilicate glass (such as Corning Gorilla® Glass), tempered glass, surface strengthened metal coated glass e.g. silver layer for charging to powder coat, conductive substrates, conductive oxides, indium tin oxide, fluorinated tin oxide, transparent conductive oxides, coated substrates and conductive polymers.

The substrates may have a coating. Exemplary coated substrates include metal coated glass, wherein at least one metal is selected from the group consisting of silver, copper, tin, and aluminum is applied to a glass plate in a pattern selected from the group consisting of full covering, partial covering, and conductive traces.

Yet another embodiment of this invention involves at least one glass plate being tempered.

Yet another embodiment of this invention is where at least one glass plate is a prelaminated glass assembly.

Yet another embodiment of this invention includes at least one glass plate being coated with conductive coatings such as transparent conductive oxide (TCO) using indium-tin oxide (ITO) material.

Seal.

The seal material can be organic, inorganic, a hybrid of organic and inorganic, or glasses having a melting point less than 500° C. In some instances the abbreviation "in/organic" will be used to mean "organic and/or inorganic."

The hybrid sealant system could have inorganic materials ratio in the range of 5-95 vol % based on the volume of organic material, preferably 10-90 vol % more preferably 20-80 vol % even more preferably 30-60 vol % organic material and 40-70 vol % inorganic material.

Organic Seal Material.

The organic seal material can be any organic material that is solid at or near room temperature most broadly thermoplastics and thermosets. In a preferred embodiment, the organic seal material is applied by electrostatic coating to the metal object. In another preferred embodiment, the organic seal material is applied by electrostatic application, powder coating, spray coating, dip coating doctor blading, stenciling, or ink-jet printing on at least one of the metal object and the substrates. A mask may be used.

Suitable organic materials include thermoplastics, thermosets, ionomers, HDPE, LDPE, polyethylene, polypropylene, polystyrene, polyvinyl chloride, polytetrafluoroethylene, acrylics, PMMA, silicones, polyesters, epoxies, epoxypolyesters, polyurethanes, halogenated plastics, condensation plastics, polyaddition plastics, cross-linking plastics, fluoropolymers, PTFE, polyamides, polycarbonates, nylons, natural rubber, styrene-butadiene rubber, PVB, PI, SRP, TPI, PAI, HTS, PFSA, PEEK, PPSU, PEI, PESU, PSU, LCP, PARA, HPN, PPS, PPA, PC, PPC, COC, ABS, PVC Alloys, PEX, PVDC, PBT, ET, POM, glycidyl methacrylate (GMA), or triglycidyl isocyanurate (TGIC). GMA acrylics are preferred.

Polyesters such as powder coatings sold by AkzoNobel under the Interpon® trademark are suitable. For example any of the following Interpon® branded products are suitable: AkzoNobel 158C121, AkzoNobel 4JC01QF, AkzoNobel 4LC01QF, AkzoNobel 4LC07QF, AkzoNobel 8A200Q, AkzoNobel 8A201Q, AkzoNobel 8A2174, AkzoNobel 8A226A, AkzoNobel 8D200Q, AkzoNobel 8D201Q, AkzoNobel 8D202Q; AkzoNobel 8D203Q, AkzoNobel 8J200Q, AkzoNobel 8J201Q, AkzoNobel 8J202Q, AkzoNobel 8J203Q, AkzoNobel 8K200Q, AkzoNobel 8K201Q, AkzoNobel 8K202Q, AkzoNobel 8K203Q, AkzoNobel 8K204K, AkzoNobel 8L200Q and other coatings sold under the Interpon name, and combinations thereof.

Other suitable organic materials, either as the organic matrix into which the inorganic particles are mixed, or as the functional coatings on the inorganic particles, include polyvinyl butyral (PVB) such those sold under the Butvar® trademark, available from Solutia, St. Louis, Mo., or Liquid Nails®, available from Akzo Nobel, Strongsville, Ohio.

Inorganic Seal Materials.

A variety of inorganic materials, usually particulate, are suitable in the seal. For example, (a) mica (sheets or flakes), (b) index matched glass powders (glass chemistry is not critical, however Na—B—Si and B—Si glass are preferred) and (c) hygroscopic inorganic additives such as zeolites, molecular sieves and other desiccant materials, (d) metal powders or flakes (up to 5 microns). Metalized PET/Mylar with metals such as aluminum are also suitable.

A variety of metals can be used, for example aluminum, copper, nickel, iron, stainless steel, 102 stainless steel, 201 stainless steel, 202 stainless steel, 300 series stainless steel, 302 stainless steel, 304 stainless steel, 308 stainless steel, 309 stainless steel, 316 stainless steel, 321 stainless steel, 405 stainless steel, 408 stainless steel, 409 stainless steel, 410 stainless steel, 416 stainless steel, 420 stainless steel, 430 stainless steel, 439 stainless steel, 440 stainless steel, 446 stainless steel, 501 stainless steel, 502 stainless steel, 630 stainless steel, 2205 stainless steel, 2304 stainless steel, 2507 stainless steel, Ni—Fe alloys, Ni—Cr alloys, chromium, molybdenum, tungsten, Invar, Kovar, Alloy 36, and Alloy 42, Alloy 42-6, Alloy 48, Alloy 49, Alloy 52, Alloy 600, Alloy 625, Inconel, Alloy 718, Nickel 200, Nickel 201, Nickel 205, Nickel 233, Nickel 270, aluminum alloys such as AL1050, AL1060, AL1100, AL3003, AL6063, AL5052, AL514, AL6061, AL384, AL2024, Tin, any of the foregoing coated in a polymer, any of the foregoing coated in any organic material disclosed elsewhere herein, and solders or alloys of any two or more of the foregoing.

The inorganic seal material may be a plurality of inorganic particles coated with any organic material disclosed herein. For example, the inorganic particles may be any of metal, glass, metal oxides, silica, quartz, cements, inorganic polymers, mica sheets, mica flakes, glass powders, Na—B—Si glass, B—Si glass, hygroscopic inorganic additives, zeolites, molecular sieves, desiccant materials, calcium chloride, calcium sulfate, magnesium chloride, zinc chloride, potassium carbonate, potassium phosphate, carnallite, ferric ammonium citrate, potassium hydroxide, and sodium hydroxide, metal powders up to 5 microns, metal flakes up to 5 microns.

In general the inorganic particle sizes ($D_{50}$) can range from 0.1 to 2000 microns, and possibly 5-1000 microns, 10-500 microns, 20-400 microns, 25-250 microns, 30-200 microns, or 0.5-80 microns, alternately 1-100 microns, 5-90 microns and 10-80 microns. The longest dimension is typically defined to be length. Aspect ratio is defined herein as length to thickness (longest to shortest dimension of a flake). The desired aspect ratio is greater than five, preferably greater than 10, more preferably greater than 20, still more preferably greater than 50, even more preferably greater than 100, and alternatively, 2-50, 2-100, 5-100 and 10-20. The particles can have shapes such as high sphericity, low sphericity, irregular, equant, ellipsoidal, tabular, cylindrical, flake, whisker and wire geometries.

Seal Glasses:

Suitable seal glasses include those having a melting point less than 600° C., preferably less than 550° C., more preferably less than 500° C., selected from the group consisting of vanadate glasses, lead glasses, tin glasses, phosphate glasses, borate glasses, bismuth glasses, telluride glasses, thallate glasses and Sn—Zn—P glasses.

The hybrid organic-inorganic composite can be applied as either a paste or a tape using standard deposition/application procedures or as a preform such as gasket seal. That is a preform of the seal can be made separately out of this hybrid organic-inorganic matrix composite. Subsequently the preform can be placed in place between the surfaces to be sealed to make the seals. The glass flake loaded curable organic material can be applied to at least one substrate by a procedure selected from the group consisting of tape casting, doctor blading, layer by layer application, screen printing, spraying, ink jet printing and combinations thereof.

Metal Object.

The metal object can be a sheet, plate, foil, wire or metal item having another shape. The metal object is used for conducting heat to the seal material in order to heat it and melt/flow the organic portion. The metal object may be aluminum, copper, nickel, iron, stainless steel, 102 stainless steel, 201 stainless steel, 202 stainless steel, 300 series stainless steel, 302 stainless steel, 304 stainless steel, 308 stainless steel, 309 stainless steel, 316 stainless steel, 321 stainless steel, 405 stainless steel, 408 stainless steel, 409 stainless steel, 410 stainless steel, 416 stainless steel, 420 stainless steel, 430 stainless steel, 439 stainless steel, 440 stainless steel, 446 stainless steel, 501 stainless steel, 502 stainless steel, 2205 stainless steel, 2304 stainless steel, 2507 stainless steel, 630 stainless steel, Ni—Fe alloys, Ni—Cr alloys, chromium, molybdenum, tungsten, Invar, Kovar, Alloy 36, and Alloy 42, Alloy 42-6, Alloy 48, Alloy 49, Alloy 52, Alloy 600, Alloy 625, Inconel, Alloy 718, Nickel 200, Nickel 201, Nickel 205, Nickel 233, Nickel 270, aluminum alloys such as AL1050, AL1060, AL1100, AL3003, AL6063, AL5052, AL514, AL6061, AL384, AL2024, Tin, and alloys of any two or more of the foregoing.

Active Layer.

An active layer is an electric or electronic device that is protected by the substrates and the seals of the invention. Suitable active layers include vacuum insulated glass, solar cell contact, solar cell, solar cell module, organic PV device, plasma display device, nanocrystal display, electrochromic device, electrochromic material system, sensors, suspended particle device, micro-blind, liquid crystal device, smart window, switchable window, smart glass, eglass, quantum dot devices, thermolelectric devices, batteries, LED, SED, FED, OLED, LCD, DLP, FLD, IMOD, TDEL, QDLED, TMOS, TPD, LCL, LPD, OLET, and combinations thereof.

Method.

An embodiment of the invention is a method of forming a seal between two substrates. The method may result in a device including a seal, the device formed by a method of locally heating a sealing material comprising: (a) providing a metal object between at least two substrates; (b) providing a seal material between the two substrates and at least partially surrounding the metal object, and (c) heating the metal object to heat the seal material to a temperature of at least 125° C., wherein the substrate temperature remains at least 20° C. below the temperature attained in the seal, to flow the seal material between the substrates. The device may be any active layer disclosed herein.

In one embodiment, in FIG. 1, assembly 100 includes substrates 110 and 120, which are used with metal frame 130. Metal frame 130 is coated with powder coating layers 140 and 150. Metal frame 130 matches the dimensions of substrates 110 and 120. Metal frame 130 includes a cut out space 135. Layers 110, 140, 130, 150, and 120 are pressed together and metal frame 130 is heated in order to flow powder coating layers 140 and 150 to effect adhesion and seal between metal frame 130 and substrates 110 and 120. A cavity inside the now sealed substrates 110 and 120 with metal frame 130 now results and may house an active layer.

Figure 2:
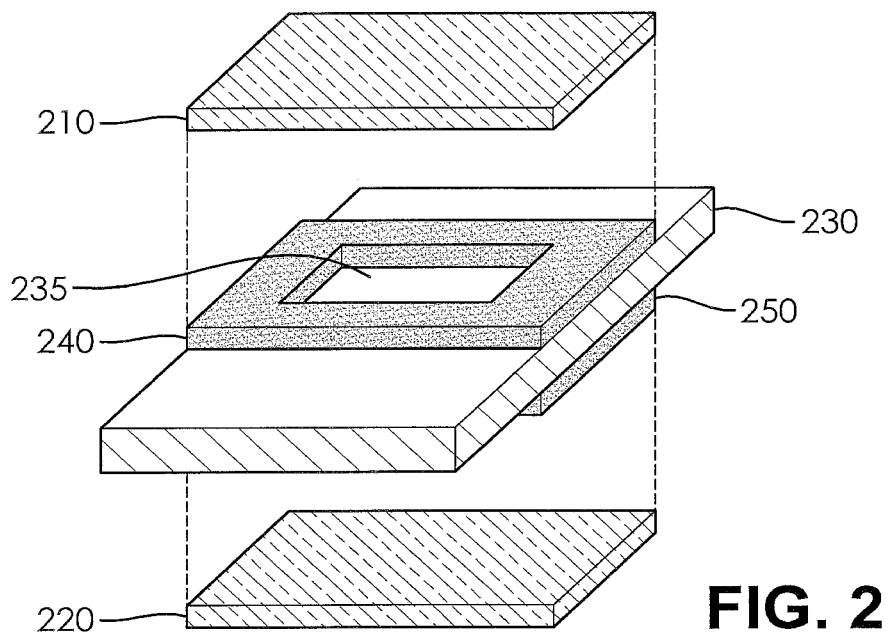
FIG. 2 is an exploded view of the components used in a sealed object of the invention.

In another embodiment, in FIG. 2, assembly 200 includes substrates 210 and 220, which are used with metal frame 230. Metal frame 230 is coated with powder coating layers 240 and 250. Metal frame 230 is larger than dimension of substrates 210 and 220, yet includes cutout 235. Powder coating layers 240 and 240 are sized to match the dimensions of substrates 210 and 220, accounting for cutout 235. Layers 210, 240, 230, 250, and 220 are pressed together and metal frame 230 is heated in order to flow powder coating layers 240 and 250 to effect adhesion and create a seal between metal frame 230 and substrates 210 and 220. A cavity inside the now sealed substrates 210 and 220 with metal frame 230 (owing to cutout 235) now results and may house an active layer. The portions of metal frame 230 that extend beyond substrates 210 and 220 may or may not be removed later.

Figure 3:
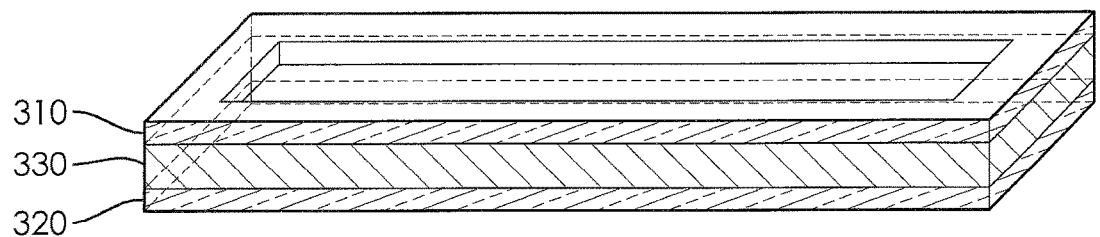

FIG. 3 is a depiction of the end result of the process depicted in FIG. 1 where 310 and 320 are the two substrates and 330 is the seal of the invention.

Figure 4:
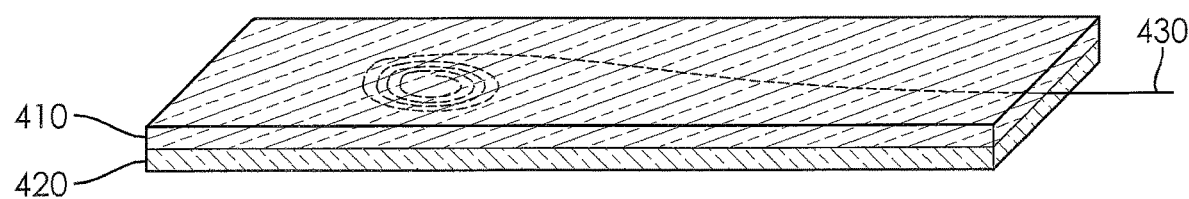
FIG. 4 depicts an embodiment of the invention having a metal wire sealed between two glass plates.

FIG. 4 is an alternate embodiment where instead of a metal plate, a wire 430 is used to effect heating between substrates 410 and 420. The portion of the wire extending beyond the cover of the substrates may be later removed.

Preheating may be used to locally heat a portion of the sealant material prior to the main heating. Similarly it is envisioned that sealing materials can be applied to the same substrate (top or bottom) and selectively sealed to the other plate with or without preheating the firing the sealing materials. Preheating may be undertaken with a laser or induction heating. Preheating may be undertaken to a temperature of, for example, 175-225° C. Details on induction heating may be found in PCT patent application PCT/US2012/054709, which is hereby incorporated by reference.

Details about aspects of the invention can be found in one or more of the following U.S. patent application, all of which are incorporated herein by reference: Ser. Nos. 10/864,304; 10/988,208; 11/131,919; 11/145,538; 11/384,838; 11/774,632; 11/846,552; 12/097,823; 12/298,956; 12/573,209; 61/324,356; 61/328,258; 61/366,568; and 61/366,578.

The term "comprising" provides support for "consisting essentially of" and "consisting of." It is envisioned that an individual numerical value for a parameter, temperature, weight, percentage, etc., disclosed herein in any form, such as presented in a table, provides support for the use of such value as the endpoint of a range. A range may be bounded by two such values. In a single embodiment, more than one glass composition can be used, and compositions comprising amounts and ranges from different columns among the tables are also envisioned.

Certain embodiments of the invention are envisioned where at least some percentages, temperatures, times, and ranges of other values are preceded by the modifier "about." All compositional percentages are by weight and are given for a blend prior to firing. Numerical ranges of oxides or other ingredients that are bounded by zero on the lower end (for example, 0-10 mole % ZnO) are intended to provide support for the concept "up to [the upper limit]," for example "up to 10 mole % $ZrO_2$" as well as a positive recitation that the ingredient in question is present in an amount that does not exceed the upper limit.

Each numerical range disclosed herein that is bounded by zero, has, as an alternative embodiment, a lower bound of 0.1% instead of zero. All ranges disclosed herein are to be understood to encompass the beginning and ending range values and any and all subranges therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 2.7, 3.3 to 8.9, 5.7 to 10, or individual values like 3.14159, 5.17, 8.07 or 9.58 for example. In other words, ranges are used as shorthand for describing each and every value that is within the range. Any value within the range can be selected as a terminus of a subrange within the range.

The invention claimed is:

1. A method of locally heating a sealing material to produce a hermetic seal, comprising:
   a. providing a metal object between at least two substrates;
   b. providing a hybrid seal material including organic material and inorganic material,
   c. contacting the seal material to the at least two substrates to at least partially sandwich the metal object between two layers of the seal material, and
   d. selectively directly heating only the metal object such that heat is transferred from the metal object to the seal material by thermal conduction to thereby only indirectly heat the seal material to a temperature of at least 125° C. to flow the organic material of the seal material between the two substrates, whereby a seal between the two substrates results, wherein temperatures of the two substrates remain at least 20° C. below the temperature attained in the seal material,
   wherein the metal object has a portion that sticks out from between the two substrates and a remainder that is arranged between the two substrates; and
   the metal object is heated by directly heating a portion such that heat is transferred through the metal object and to the seal material by thermal conduction to thereby only indirectly heat the seal material.

2. The method of claim 1, wherein the seal material includes at least one glass having a melting point less than 600° C. selected from the group consisting of vanadate glasses, lead based glasses, tin glasses, phosphate glasses, borate glasses, bismuth glasses, thallate glasses, and Sn—Zn—P glasses.

3. The method of claim 1, wherein prior to (c) at least one of the metal object and the seal material is preheated by laser or induction heating.

4. The method of claim 1, wherein:
   the seal material is contacted as a powder coating to the metal object; and the at least two substrates are independently selected from the group consisting of metal, glass, very low expansion glass ceramics, ceramics, low expansion borosilicate glass, aluminosilicate glass, ion-exchanged sodium aluminosilicate glass, potassium exchanged aluminosilicate glass chemically strengthened glass, tempered glass, surface strengthened metal coated glass, conductive substrates, conductive oxides, indium tin oxide, fluorinated tin oxide, and transparent conductive oxides.

5. The method of claim 4, wherein at least one of the two substrates is metal-coated glass, including at least one metal selected from the group consisting of silver, copper, tin, and aluminum is applied to a glass plate.

6. The method of claim 1, wherein the metal object is a wire, and the method further comprises removing the portion from the remainder after the seal is formed.

7. The method of claim 1, wherein the metal object is a sheet of metal having a thickness, and the method further comprises removing the portion from the remainder after the seal is formed.

8. The method of claim 7, wherein the sheet of metal includes a cut out portion, and an active layer is provided in a cavity formed by the cut out portion and the substrates.

9. The method of claim 1, wherein a cavity is formed by the substrates, the metal object and the seal, and wherein the cavity houses a device selected from the group consisting of vacuum insulated glass, solar cell contact, solar cell, solar cell module, organic PV device, plasma display device, nanocrystal display, electrochromic device, electrochromic material system, sensors, suspended particle device, microblind, liquid crystal device, smart window, switchable window, smart glass, eglass, quantum dot devices, thermolelectric devices, batteries, LED, SED, FED, OLED, LCD, DLP, FLD, IMOD, TDEL, QDLED, TMOS, TPD, LCL, LPD, OLET, and combinations thereof.

10. The method of claim 1, wherein:
the seal material is applied to the metal object as a powder coating, and
the seal material includes at least one selected from the group consisting of thermoplastics, thermosets, ionomer resins, polyethylene, polypropylene, polystyrene, polyvinyl chloride, HDPE, LDPE polytetrafluoroethylene, acrylics, PMMA, silicones, polyesters, epoxies, epoxypolyesters, polyurethanes, halogenated plastics, condensation plastics, polyaddition plastics, cross-linking plastics, fluoropolymers, PTFE, polyamides, polycarbonates, nylons, natural rubber, styrene-butadiene rubber, PVB, PI, SRP, TPI, PAI, HTS, PFSA, PEEK, PPSU, PEI, PESU, PSU, LCP, PARA, HPN, PPS, PPA, PC, PPC, COC, ABS, PVC Alloys, PEX, PVDC, PBT, ET, POM, glycidyl methacrylate, and triglycidyl isocyanurate.

11. The method of claim 1, wherein at least one substrate is selected from the group consisting of metal, metal coated glass, conductive substrates and conductive oxides, wherein the seal material is applied as a powder coating to the metal object using a mask.

12. The method of claim 1, wherein at least one substrate is a ceramic.

13. The method of claim 1, wherein at least one substrate is a glass-ceramic.

14. The method of claim 1, wherein the metal object includes a metal selected from the group consisting of aluminum; aluminum alloys including AL1050, AL1060, AL1100, AL3003, AL6063, AL5052, AL514, AL6061, AL384, AL2024; copper, nickel, iron, stainless steel, 102 stainless steel, 201 stainless steel, 202 stainless steel, 300 series stainless steel, 302 stainless steel, 304 stainless steel, 308 stainless steel, 309 stainless steel, 316 stainless steel, 321 stainless steel, 405 stainless steel, 408 stainless steel, 409 stainless steel, 410 stainless steel, 416 stainless steel, 420 stainless steel, 430 stainless steel, 439 stainless steel, 440 stainless steel, 446 stainless steel, 501 stainless steel, 502 stainless steel, 2205 stainless steel, 2304 stainless steel, 2507 stainless steel, 630 stainless steel, Ni—Fe alloys, Ni—Cr alloys, chromium, molybdenum, tungsten, Invar, Kovar, Alloy 36, and Alloy 42, Alloy 42-6, Alloy 48, Alloy 49, Alloy 52, Alloy 600, Alloy 625, Inconel, Alloy 718, Nickel 200, Nickel 201, Nickel 205, Nickel 233, Nickel 270, Tin, any of the foregoing coated in a polymer, and alloys of any two or more of the foregoing.

15. The method of claim 1 wherein the seal material is inorganic particles distributed in a matrix of the organic material.

16. The method of claim 15, wherein the inorganic particles are selected from the group consisting of metal, glass, metal oxides, silica, quartz, cements, inorganic polymers, mica sheets, mica flakes, glass powders, Na—B—Si glass, B—Si glass, hygroscopic inorganic additives, zeolites, molecular sieves, desiccant materials, calcium chloride, calcium sulfate, magnesium chloride, zinc chloride, potassium carbonate, potassium phosphate, carnallite, ferric ammonium citrate, potassium hydroxide, and sodium hydroxide, metal powders up to 5 microns, and metal flakes up to 5 microns.

17. The method of claim 1, wherein providing the hybrid seal material includes at least one of electrostatic deposition, powder coating, spray coating, dip coating doctor blading, stenciling, and ink-jet printing the hybrid seal material on at least one of the metal object and the substrates.

18. A device including a seal made by the method of claim 1.

19. The method of claim 1, wherein the seal material is provided in the form of a tape.

20. The method of claim 1, wherein the organic material includes HDPE, LDPE, polyethylene, polypropylene, polystyrene, polyvinyl chloride, polytetrafluoroethylene, acrylics, PMMA, silicones, polyesters, epoxies, epoxypolyesters, polyurethanes, halogenated plastics, condensation plastics, polyaddition plastics, cross-linking plastics, fluoropolymers, PTFE, polyamides, polycarbonates, nylons, natural rubber, styrene-butadiene rubber, PVB, PI, SRP, TPI, PAI, HTS, PFSA, PEEK, PPSU, PEI, PESU, PSU, LCP, PARA, HPN, PPS, PPA, PC, PPC, COC, ABS, PVC Alloys, PEX, PVDC, PBT, ET, POM, glycidyl methacrylate (GMA), triglycidyl isocyanurate (TGIC), or combinations thereof.

\* \* \* \* \*